(12) United States Patent
Yazawa et al.

(10) Patent No.: US 10,344,872 B2
(45) Date of Patent: Jul. 9, 2019

(54) ELECTRIC VALVE HAVING A VALVE BODY WITH A CONSTRICTED SURFACE PORTION

(71) Applicant: FUJIKOKI CORPORATION, Tokyo (JP)

(72) Inventors: Masashi Yazawa, Tokyo (JP); Tatsuya Yoshida, Tokyo (JP); Tomokazu Kiuchi, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 15/876,327

(22) Filed: Jan. 22, 2018

(65) Prior Publication Data

US 2018/0238455 A1 Aug. 23, 2018

(30) Foreign Application Priority Data

Feb. 22, 2017 (JP) ................................ 2017-031015

(51) Int. Cl.
| | | |
|---|---|---|
| *F16K 1/38* | (2006.01) | |
| *F16K 1/12* | (2006.01) | |
| *F16K 31/50* | (2006.01) | |
| *F16K 31/04* | (2006.01) | |
| *F16K 1/54* | (2006.01) | |

(Continued)

(52) U.S. Cl.
CPC ............... *F16K 1/385* (2013.01); *F16K 1/12* (2013.01); *F16K 1/54* (2013.01); *F16K 31/047* (2013.01); *F16K 31/508* (2013.01); *F25B 41/062* (2013.01); *F25B 41/04* (2013.01); *F25B 2341/0653* (2013.01); *F25B 2600/2515* (2013.01); *Y02B 30/72* (2013.01)

(58) Field of Classification Search
CPC .......... F16K 1/385; F16K 1/12; F16K 31/047; F16K 31/508; F16K 1/54; F25B 41/062; F25B 2341/0653; F25B 41/04; F25B 2600/2515
USPC .......................... 251/120–124, 292, 332–333
See application file for complete search history.

(56) References Cited

U.S. PATENT DOCUMENTS 1,597,627 A * 8/1926 Sellinger ................. F16K 1/385
251/219
1,645,601 A * 10/1927 Lee ........................ F16K 47/04
251/122

(Continued)

FOREIGN PATENT DOCUMENTS

| | | |
|---|---|---|
| EP | 2843272 A1 | 3/2015 |
| JP | S61-10174 A | 1/1986 |
| JP | 2011-208716 A | 10/2011 |

OTHER PUBLICATIONS

Extended European Search Report in corresponding European Application No. EP 18152874.6, dated Feb. 20, 2018.

*Primary Examiner* — John Bastianelli
(74) *Attorney, Agent, or Firm* — Bacon & Thomas, PLLC (57) ABSTRACT

An electric valve includes a seating surface portion attached to a valve seat and a curved surface portion inserted into a valve port that are disposed in a valve body. A constricted surface portion smaller in outer diameter than an upper end portion of the curved surface portion is provided between the seating surface portion and the curved surface portion. As a result, a rising flow rate can be sufficiently reduced and controllability in a low flow range can be effectively improved with management of the rising flow rate simplified.

4 Claims, 6 Drawing Sheets

(51) Int. Cl.
*F25B 41/06* (2006.01)
*F25B 41/04* (2006.01)

(56) References Cited

U.S. PATENT DOCUMENTS

| | | | |
|---|---|---|---|
| 1,919,232 A | | 7/1933 | Lee |
| 3,243,157 A | * | 3/1966 | Rudolf .................... F16K 47/04 |
| | | | 251/122 |
| 3,512,550 A | * | 5/1970 | Ammann .............. F16K 31/365 |
| | | | 251/122 |
| 4,720,076 A | * | 1/1988 | Hyde ................... B67D 1/1416 |
| | | | 251/122 |
| 5,022,557 A | * | 6/1991 | Turner ................. B67D 1/0855 |
| | | | 222/54 |
| 7,757,713 B2 | * | 7/2010 | Lohrberg .............. F16K 11/044 |
| | | | 251/122 |
| 2003/0111119 A1 | * | 6/2003 | Baumann .............. F16K 39/022 |
| | | | 137/625.3 |
| 2005/0109966 A1 | * | 5/2005 | Berghoff ................... F16K 1/38 |
| | | | 251/122 |
| 2012/0074346 A1 | | 3/2012 | Cook |

\* cited by examiner

ELECTRIC VALVE HAVING A VALVE BODY WITH A CONSTRICTED SURFACE PORTION

TECHNICAL FIELD

The present invention relates to an electric valve that is provided with a valve main body in which a valve chamber and a valve port (orifice) are disposed and a valve body changing the flow rate of a fluid flowing through the valve port in accordance with a lift amount and, more particularly, to an electric valve that is suitable for controlling a refrigerant flow rate in a heat pump-type cooling and heating system or the like.

BACKGROUND ART

An electric valve disclosed in, for example, Patent Document 1 is already known as an electric valve of this type.

Figure 6:
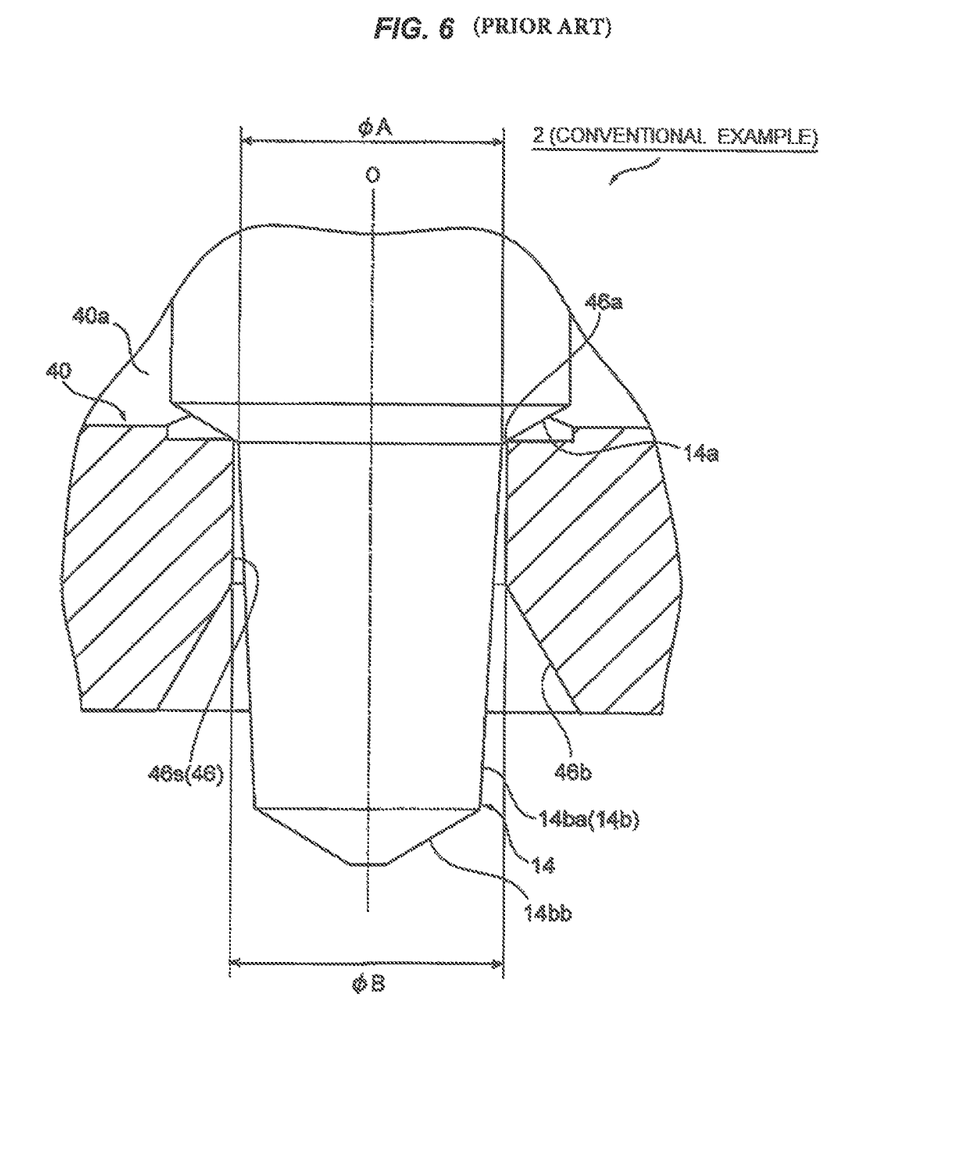
FIG. 6 is an enlarged longitudinal sectional view of a main part in which a main part of a conventional electric valve is illustrated in an enlarged manner.

FIG. 6 shows a main part of the electric valve according to the conventional example described above. An electric valve 2 according to the illustrated conventional example is provided with a valve main body 40 in which a valve chamber 40a, a valve seat 46a, and a valve port 46 continuous to the valve seat 46a are disposed and a valve body 14 changing the flow rate of a fluid flowing through the valve port 46 in accordance with the lift amount from the valve seat 46a. The valve body 14 is raised and lowered to come into contact with and be separated from the valve seat 46a by a screw feed-type raising and lowering drive mechanism including a screw pipe (also referred to as a guide bush) in which a male screw portion is disposed, a valve stem holder in which a female screw portion is disposed, a stepping motor, and so on as described in, for example, Patent Document 1.

The valve body 14 has a seating surface portion 14a that includes an inverted truncated cone surface attached to the valve seat 46a and a curved surface portion 14b that is continuous to the lower side (tip side) of the seating surface portion 14a to change the flow rate of the fluid flowing through the valve port 46 in accordance with the lift amount. The curved surface portion 14b has an inverted truncated cone-shaped tapered surface portion (upper-side tapered surface portion 14ba and lower-side tapered surface portion 14bb) that has a plurality of stages (two stages herein), and the tapered surface portion has a control angle (crossing angle with a line parallel to a central axis O of the valve body 14) increasing in stages toward the tip. An ellipsoidal curved surface portion (ellipsoidal surface portion) and the like that have an outer peripheral surface increasingly bent (having a curvature increasing) in a gradual manner toward the tip are also known as the curved surface portion 14b.

The valve port 46 has a narrowest portion 46s that includes a cylindrical surface continuous to the valve seat 46a and a diameter-enlarged portion 46b that includes a truncated cone surface which is continuous to the lower side of the narrowest portion 46s and has an inner diameter increasing toward the lower side.

CITATION LIST

Patent Document

Patent Document 1: JP 2011-208716 A

SUMMARY OF THE INVENTION

Problem to be Solved by the Invention

In recent years, controllability improvement in a low flow range has been required regarding this type of electric valves due to the use of the R32 refrigerant, an increase in partial load operation, and so on. In addition, a reduction in rising flow rate is also desired regarding valve-closing type electric valves used in cooling and heating systems such as multi air conditioners.

The electric valve according to the conventional example as illustrated in FIG. 6, however, has a problem in that the rising flow rate is formed by the difference between the outer diameter ($\varphi$A) of the part at which the seating surface portion 14a and the curved surface portion 14b (upper-side tapered surface portion 14ba) intersect with each other and the diameter ($\varphi$B) of the narrowest portion 46s of the valve port 46, the measurement of the dimension of the outer diameter ($\varphi$A) of the intersection part (dimensional measurement by a contact-type measuring instrument in particular) is complicated, and thus the rising flow rate cannot be managed with ease.

Although providing a straight portion that has a constant outer diameter in the raising and lowering direction (central axis O direction) between the seating surface portion 14a and the curved surface portion 14b (upper-side tapered surface portion 14ba) and simplifying the dimensional measurement by using the straight portion has already been studied to deal with this problem, this measure alone results in the generation of a region with no flow rate change, and thus the possibility of a decline in resolution (resolution in the low flow range in particular) still remains.

In addition, a corner R (also referred to as a cutter R) is generated, as a result of machining, at the part at which the seating surface portion 14a and the curved surface portion 14b (upper-side tapered surface portion 14ba) intersect with each other and at the part at which the seating surface portion 14a and the straight portion intersect with each other, and outer diameters relatively smaller than the diameter of the narrowest portion 46s of the valve port 46 need to be set for the curved surface portion 14b and the straight portion to avoid seating at the corner R. This results in the possibility of an insufficient reduction in rising flow rate.

The invention has been made in view of the problems described above, and an object thereof is to provide an electric valve with which a rising flow rate can be sufficiently reduced and controllability in a low flow range can be effectively improved with management of the rising flow rate simplified.

Means for Solving Problem

In order to solve the above problems, an electric valve according to the invention basically includes a valve main body having a valve chamber and a valve port to which a valve seat is attached and a valve body changing a flow rate of a fluid flowing through the valve port in accordance with a lift amount, in which a seating surface portion attached to the valve seat and a curved surface portion inserted into the valve port and having a curvature or a control angle increasing continuously or in stages toward a tip are disposed in the valve body and a constricted surface portion smaller in outer diameter than a base end portion of the curved surface portion is provided between the seating surface portion and the curved surface portion.

In a preferred aspect, a straight portion having a constant outer diameter in a raising and lowering direction is further disposed between the constricted surface portion and the curved surface portion of the valve body.

In another preferred aspect, a narrowest portion including a cylindrical surface continuous to the valve seat is disposed at the valve port.

In still another preferred aspect, the constricted surface portion is configured as an annular concave surface in a cross section including an axis.

In still another preferred aspect, a tip portion of the seating surface portion is smaller in outer diameter than the base end portion of the curved surface portion.

Effect of the Invention

According to the invention, the constricted surface portion smaller in outer diameter than the base end portion of the curved surface portion is provided between the seating surface portion and the curved surface portion of the valve body. Accordingly, the generation of a corner R in the seating surface portion can be suppressed by the constricted surface portion and seating at the corner R as described above can be avoided with the curved surface portion maintaining a large outer diameter, and thus a rising flow rate can be sufficiently reduced and controllability in a low flow range can be effectively improved with management of the rising flow rate simplified compared to conventional electric valves in which, for example, a curved surface portion and a straight portion are continuous to the lower side (tip side) of a seating surface portion.

In addition, the straight portion having the constant outer diameter in the raising and lowering direction is disposed between the constricted surface portion and the curved surface portion of the valve body, and thus the controllability in the low flow range can be more effectively improved with the management of the rising flow rate further simplified.

MODE FOR CARRYING OUT THE INVENTION

Hereinafter, an embodiment of the invention will be described with reference to drawings. In each of the drawings, gaps formed between members, separation distances between members, and the like are exaggeratedly drawn in some cases for easy understanding of the invention and convenience of drawing. In the present specification, description indicating positions and directions such as upper, lower, left, and right is based on the direction arrow display in FIG. 1 and does not point to positions and directions in an actual use state.

Figure 1:
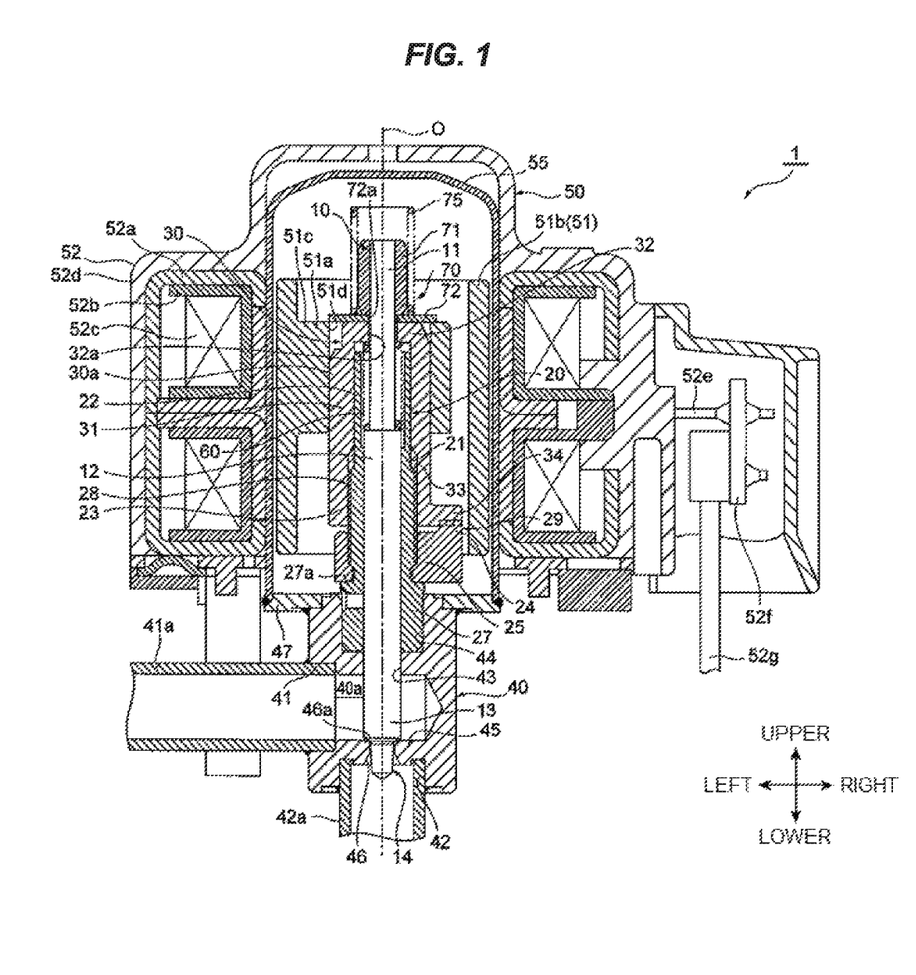
FIG. 1 is a longitudinal sectional view illustrating an embodiment of an electric valve according to the invention.

FIG. 1 is a longitudinal sectional view illustrating an embodiment of an electric valve according to the invention.

An electric valve 1 according to the illustrated embodiment is used to adjust a refrigerant flow rate in a heat pump-type cooling and heating system or the like and is mainly provided with a valve stem 10 that has a valve body 14, a guide bush 20, a valve stem holder 30, a valve main body 40, a can 55, a stepping motor 50 that includes a rotor 51 and a stator 52, a compression coil spring 60, a retaining locking member 70, a screw feed mechanism 28, and a lower stopper mechanism 29.

The valve stem 10 has an upper small-diameter portion 11, an intermediate large-diameter portion 12, and a lower small-diameter portion 13 from the upper side, and the valve body 14 for controlling the passage flow rate of a fluid (refrigerant) flowing through a valve port 46 is integrally formed in the lower end portion of the lower small-diameter portion 13.

Figure 2:
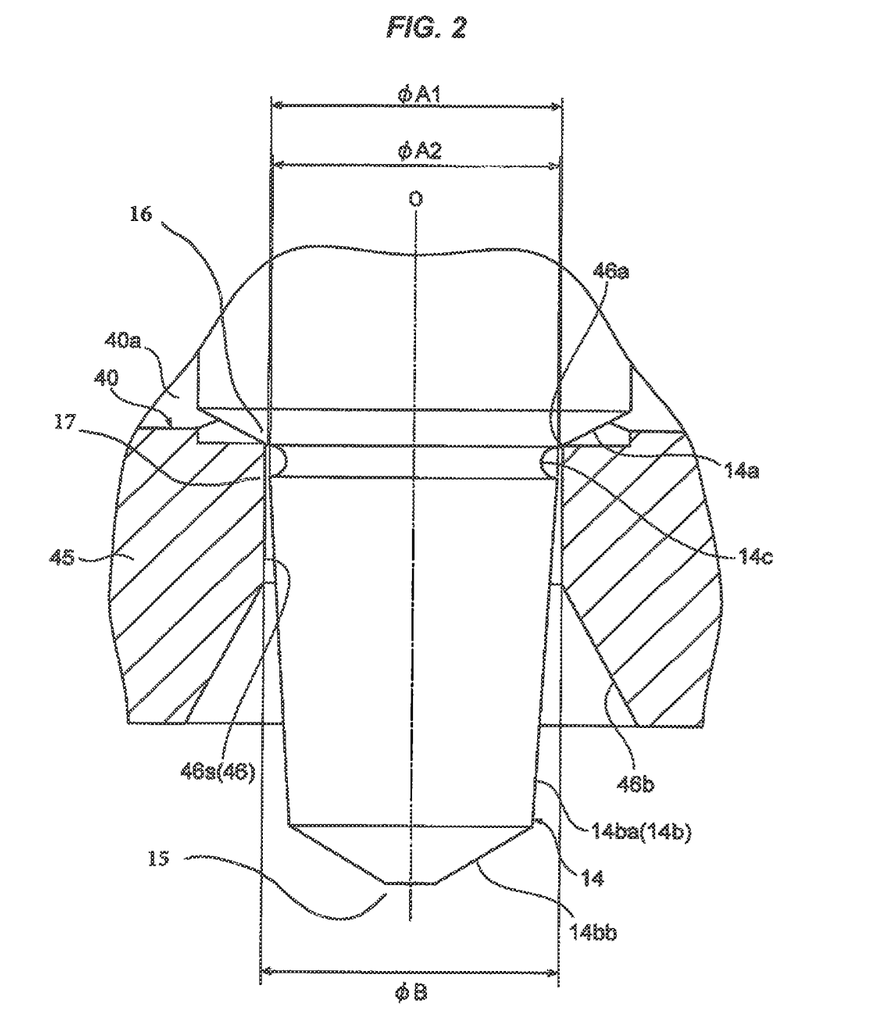
FIG. 2 is an enlarged longitudinal sectional view of a main part in which a main part of the electric valve illustrated in FIG. 1 is illustrated in an enlarged manner.

As will be clearly understood by referring to FIG. 2 along with FIG. 1, the valve body 14 has a seating surface portion 14a that includes an inverted truncated cone surface attached to (seated on) a valve seat 46a and a curved surface portion 14b that is inserted into the valve port 46 to change the flow rate of the fluid flowing through the valve port 46 in accordance with the lift amount from the valve seat 46a from the upper side (valve chamber 40a side). The curved surface portion 14b has an inverted truncated cone-shaped tapered surface portion that has a plurality of stages (two stages herein), and the tapered surface portion has a control angle (crossing angle with a line parallel to a central axis O of the valve body 14) increasing in stages toward the tip 15. Herein, the inverted truncated cone-shaped tapered surface portion that has the plurality of stages (two stages) has an upper-side tapered surface portion 14ba that includes an inverted truncated cone surface and a lower-side tapered surface portion 14bb that includes an inverted truncated cone surface which has a control angle larger than the control angle of the upper-side tapered surface portion 14ba.

In addition, a constricted surface portion 14c that is smaller in outer diameter than the lower end portion (tip portion) 16 of the seating surface portion 14a and the upper end portion (base end portion) 17 of the curved surface portion 14b is provided between the seating surface portion 14a and the curved surface portion 14b of the valve body 14 (that is, directly below the seating surface portion 14a and directly above the curved surface portion 14b). Although an annular concave surface (curved surface) that has a constant curvature constitutes the constricted surface portion 14c in a cross section including the central axis O in the present example, the shape of the constricted surface portion 14c is not limited to the illustrated example (the other shapes of the constricted surface portion will be described later). The height of the constricted surface portion 14c in the vertical direction (axis O direction) is designed in view of the rising characteristics of the flow rate and the like.

The guide bush 20 has a cylindrical portion 21 that is interpolated in a state where (the intermediate large-diameter portion 12 of) the valve stem 10 is capable of relatively moving (sliding) in the axis O direction and is relatively rotatable about the axis O and an extending portion 22 that extends upward from the upper end portion of the cylindrical portion 21 and is larger in inner diameter than the cylindrical portion 21. The upper end side of the intermediate large-diameter portion 12 of the valve stem 10 and the lower end side of the upper small-diameter portion 11 are interpolated into the extending portion 22. A fixing screw portion (male screw portion) 23 that constitutes a part of the screw feed mechanism 28 which raises and lowers the valve body 14 of the valve stem 10 with respect to the valve seat 46*a* of the valve main body 40 in response to rotational drive of the rotor 51 is formed on the outer periphery of the cylindrical portion 21 of the guide bush 20. In addition, the lower portion of the cylindrical portion 21 (part below the fixing screw portion 23) has a large diameter as a fitting portion 27 fitted into a fitting hole 44 in the valve main body 40. A lower stopper 25 is screwed into and fixed to the fixing screw portion 23 (side of the fixing screw portion 23 that is below the valve stem holder 30), and a fixed stopper body 24 that constitutes a part of the lower stopper mechanism 29 performing rotational downward movement regulation on the valve stem holder 30 (that is, the valve stem 10 connected to the valve stem holder 30) integrally protrudes from the outer periphery of the lower stopper 25. An upper surface 27*a* of the fitting portion 27 is a stopper portion performing downward movement regulation on the lower stopper 25 (that is, defining the downward movement limit position or the lowest movement position of the lower stopper 25).

The valve stem holder 30 has a cylindrical portion 31 into which the guide bush 20 is interpolated and a ceiling portion 32 through which an insertion hole 32*a* into which the upper end portion of (the upper small-diameter portion 11 of) the valve stem 10 is inserted passes. A movable screw portion (female screw portion) 33 that constitutes the screw feed mechanism 28 by being screwed together with the fixing screw portion 23 of the guide bush 20 is formed on the inner periphery of the cylindrical portion 31 of the valve stem holder 30, and a movable stopper body 34 that constitutes the other part of the lower stopper mechanism 29 integrally protrudes from the lower end of the outer periphery of the cylindrical portion 31.

The compression coil spring 60 performing biasing in a direction to separate the valve stem 10 and the valve stem holder 30 in the raising and lowering direction (axis O direction), that is, biasing the valve stem 10 (valve body 14) downward (in a valve-closing direction) at all times is compressed between a terrace surface formed between the upper small-diameter portion 11 and the intermediate large-diameter portion 12 of the valve stem 10 and the lower surface of the ceiling portion 32 of the valve stem holder 30 to be extrapolated to the upper small-diameter portion 11 of the valve stem 10.

The valve main body 40 includes a cylindrical body formed of a metal such as brass and SUS. The valve main body 40 has the valve chamber 40*a* therein, the fluid is introduced into and derived from the valve chamber 40*a*, a first conduit 41*a* is connected and fixed by brazing or the like to a lateral first opening 41 disposed in a side portion of the valve chamber 40*a*, an insertion hole 43 into which (the intermediate large-diameter portion 12 of) the valve stem 10 is inserted in a state where (the intermediate large-diameter portion 12 of) the valve stem 10 is capable of relatively moving (sliding) in the axis O direction and is relatively rotatable about the axis O and the fitting hole 44 into which the lower portion (fitting portion 27) of the guide bush 20 is fitted to be mounted and fixed are formed in the ceiling portion of the valve chamber 40*a*, and a second conduit 42*a* is connected and fixed by brazing or the like to a vertical second opening 42 disposed in the lower portion of the valve chamber 40*a*. In addition, the valve port 46 that has the valve seat 46*a* which allows the valve body 14 to come into contact with and be separated from the valve seat 46*a* is formed in a valve seat portion 45 including a bottom wall portion disposed between the valve chamber 40*a* and the second opening 42.

As will be clearly understood by referring to FIG. 2 along with FIG. 1, the valve port 46 has a narrowest portion (part of the valve port 46 with the smallest diameter) 46*s* that includes a cylindrical surface continuous to the valve seat 46*a* (with a constant inner diameter in the raising and lowering direction) and a diameter-enlarged portion 46*b* that includes a truncated cone surface which is continuous to the lower side of the narrowest portion 46*s* and has an inner diameter continuously increasing toward the lower side from the upper side (valve chamber 40*a* side).

The inner diameter (diameter) ($\varphi B$) of the valve seat 46*a* (narrowest portion 46*s* of the valve port 46) is designed to be smaller than the inner diameter of the lower small-diameter portion 13 of the valve stem 10 and is designed to be slightly larger than the outer diameter ($\varphi A1$) of the lower end portion of the seating surface portion 14*a* of the valve body 14 and the outer diameter ($\varphi A2$) of the upper end portion of the curved surface portion 14*b*. In the present example, the outer diameter ($\varphi A1$) of the lower end portion (tip portion) of the seating surface portion 14*a* and the outer diameter ($\varphi A2$) of the upper end portion (base end portion) of the curved surface portion 14*b* are almost equal to each other. Specifically, the inner diameter ($\varphi B$) of the valve seat 46*a* is larger by 0.005 mm to 0.015 mm than the outer diameter ($\varphi A1$) of the lower end portion of the seating surface portion 14*a* of the valve body 14 and the outer diameter ($\varphi A1$) of the lower end portion of the seating surface portion 14*a* is larger by 0 mm to 0.015 mm than the outer diameter ($\varphi A2$) of the upper end portion of the curved surface portion 14*b*.

A flanged plate 47 is fixed by caulking or the like to the upper end portion of the valve main body 40, and the lower end portion of the can 55 that has the shape of a cylinder which has a ceiling is hermetically bonded by butt welding to a stepped portion disposed on the outer periphery of the flanged plate 47.

The rotor 51 is rotatably arranged inside the can 55 and outside the guide bush 20 and the valve stem holder 30, and the stator 52 including a yoke 52*a*, a bobbin 52*b*. a stator coil 52*c*, a resin mold cover 52*d*. and so on is arranged outside the can 55 for the rotor 51 to be driven to rotate. A plurality of lead terminals 52*e* is connected to the stator coil 52*c*, a plurality of lead wires 52*g* is connected to the lead terminals 52*e* via a substrate 52*f*, and the rotor 51 arranged in the can 55 rotates about the axis O by energizing excitation to the stator coil 52*c*.

The rotor 51 arranged in the can 55 is engaged with and supported by the valve stem holder 30, and the valve stem holder 30 rotates in conjunction (integrally) with the rotor 51.

Specifically, the rotor 51 has a double pipe configuration that includes an inner cylinder 51*a*, an outer cylinder 51*b*, and a connecting portion 51*c* connecting the inner cylinder 51*a* and the outer cylinder 51*b* to each other at a predetermined angular position about the axis O, and a vertical groove 51*d* extending in the axis O direction (vertical direction) is formed in the inner periphery of the inner cylinder 51*a* (with, for example, an angular interval of 120 degrees about the axis O).

A ridge 30*a* extending in the vertical direction protrudes from (the upper half part of) the outer periphery of the valve stem holder 30 (with, for example, an angular interval of 120 degrees about the axis O), and an upward locking surface (not illustrated) supporting the rotor 51 is formed on both sides of the lower portion of the ridge 30*a*.

The rotor 51 is supported and fixed in a state where the rotor 51 is aligned with respect to the valve stem holder 30 by the vertical groove 51*d* in the inner cylinder 51*a* of the rotor 51 and the ridge 30*a* of the valve stem holder 30 being engaged with each other and the lower surface of the inner cylinder 51*a* of the rotor 51 and the locking surface of the valve stem holder 30 abutting against each other, and then the valve stem holder 30 rotates with the rotor 51 while supporting the rotor 51 in the can 55.

The retaining locking member 70 including a push nut 71 externally fitted and fixed to the upper end portion of (the upper small-diameter portion 11 of) the valve stem 10 by press fitting, welding, or the like and a rotor retainer 72 including a disk-shaped member interposed between the push nut 71 and the rotor 51 with an insertion hole 72*a* into which the upper end portion of the valve stem 10 is inserted formed in the middle is arranged on the upper sides of the rotor 51 and the valve stem holder 30 to prevent relative movements of the valve stem holder 30 and the rotor 51 in the raising and lowering direction (that is, to press the rotor 51 downward with respect to the valve stem holder 30) and connect the valve stem 10 and the valve stem holder 30 to each other. In other words, the rotor 51 is sandwiched between the valve stem holder 30 biased upward by the biasing force of the compression coil spring 60 and the rotor retainer 72. The height from the upper end of the valve stem holder 30 to the locking surface (in the vertical direction) is equal to the height of the inner cylinder 51*a* of the rotor 51 (in the vertical direction), and the upper surface of (the ceiling portion 32 of) the valve stem holder 30 abuts against the lower surface (flat surface) of the rotor retainer 72.

A return spring 75 that includes a coil spring which biases the valve stem holder 30 to the guide bush 20 side is externally placed on the push nut 71 fixed to the upper end portion of the valve stem 10 to prevent unscrewing of the fixing screw portion 23 of the guide bush 20 and the movable screw portion 33 of the valve stem holder 30 attributable to an excessive upward movement of the valve stem holder 30 with respect to the guide bush 20 during an operation.

Figure 3:
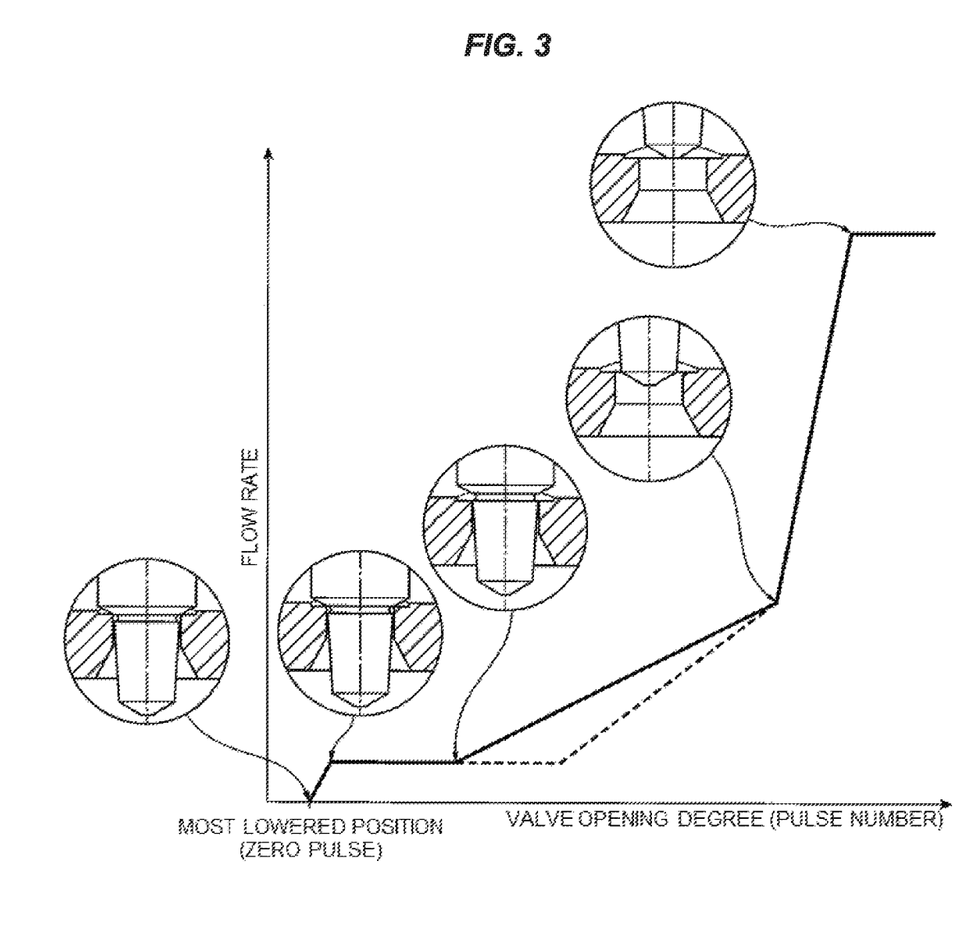
FIG. 3 is a diagram illustrating the flow characteristics of the electric valve illustrated in FIG. 1.

In the electric valve 1 configured as described above, the valve stem holder 30 and the valve stem 10 rotate integrally with the rotor 51 once the rotor 51 is rotated by the energizing excitation to (the stator coil 52*c* of) the stator 52. At this time, the valve stem 10 is raised and lowered with the valve body 14 by the screw feed mechanism 28 including the fixing screw portion 23 of the guide bush 20 and the movable screw portion 33 of the valve stem holder 30. As a result, the passage flow rate of the fluid such as the refrigerant is adjusted by the gap (lift amount, valve opening degree) between the valve body 14 and the valve seat 46*a* being increased and decreased (refer to the flow characteristics indicated by the solid line in FIG. 3). In addition, when the movable stopper body 34 of the valve stem holder 30 and the fixed stopper body 24 of the lower stopper 25 fixed to the guide bush 20 abut against each other and the valve body 14 is at the most lowered position (when the lift amount of the valve body 14 is zero), the valve port 46 is in a fully-closed state with (the seating surface portion 14*a* of) the valve body 14 seated on the valve seat 46*a* and the flow of the fluid such as the refrigerant through the valve port 46 is blocked (state illustrated in FIGS. 1 and 2).

In the present embodiment, the constricted surface portion 14*c* that connects the seating surface portion 14*a* and the curved surface portion 14*b* of the valve body 14 to each other is interposed between the seating surface portion 14*a* and the curved surface portion 14*b* of the valve body 14. Accordingly, a corner R (cutter R) can be excluded from the seating surface portion 14*a* of the valve body 14, the outer diameter ($\varphi$A2) of (the upper end portion of) the curved surface portion 14*b* interpolated into the valve port 46 is close to the inner diameter ($\varphi$B) of the valve seat 46*a* (narrowest portion 46*s* of the valve port 46), and the gap between (the upper end portion of) the curved surface portion 14*b* and the narrowest portion 46*s* of the valve port 46 is extremely narrow.

As described above, in the present embodiment, the generation of the corner R in the seating surface portion 14*a* can be suppressed by the constricted surface portion 14*c* and seating at the corner R as described above can be avoided with the curved surface portion 14*b* maintaining a large outer diameter, and thus a rising flow rate can be sufficiently reduced and controllability in a low flow range can be effectively improved with management of the rising flow rate simplified compared to conventional electric valves in which, for example, a curved surface portion and a straight portion are continuous to the lower side of a seating surface portion.

Figure 4:
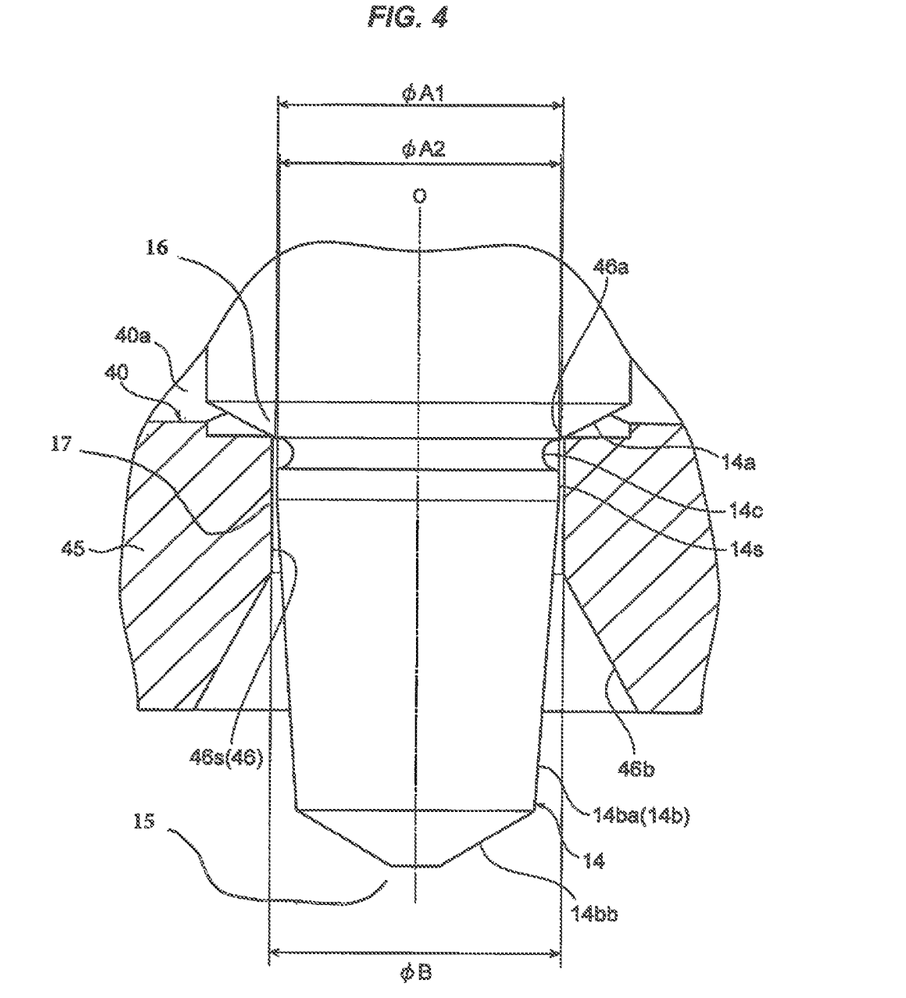
FIG. 4 is an enlarged longitudinal sectional view of a main part in which a main part of another example of the electric valve illustrated in FIG. 1 is illustrated in an enlarged manner.

Although the constricted surface portion 14*c* is disposed between the seating surface portion 14*a* and the curved surface portion 14*b* of the valve body 14 (that is, directly below the seating surface portion 14*a* and directly above the curved surface portion 14*b*) in the embodiment described above, a straight portion 14*s* that includes a cylindrical surface (with a constant outer diameter in the raising and lowering direction) may also be disposed between the constricted surface portion 14*c* and the curved surface portion 14*b* of the valve body 14 as illustrated in, for example, FIG. 4. In the example illustrated in FIG. 4, the straight portion 14*s* that has a height almost equal to the height of the constricted surface portion 14*c* (in the vertical direction) is formed directly below the constricted surface portion 14*c*. In this case, a part with no flow rate change becomes long in the low flow range (refer to the flow characteristics indicated by the dotted line in FIG. 3), and thus the controllability in the low flow range can be more effectively improved with the management of the rising flow rate further simplified. By necking being performed to cause a part of the valve body 14 corresponding to the straight portion 14*s* to be recessed, the length of the narrowest portion 46*s* where the distance between the valve port 46 and the valve stem 10 is shortest can be reduced and the risk of foreign matter being stuck can be reduced.

Figure 5A:
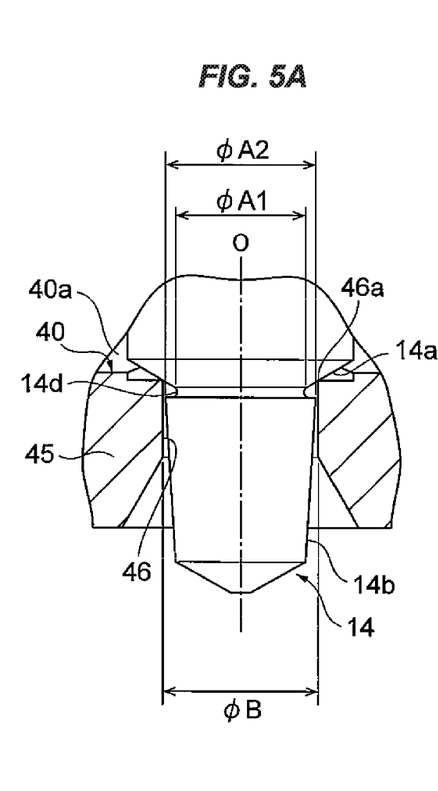
FIGS. 5A to 5C are enlarged longitudinal sectional views of a main part in which main parts of still another examples of the electric valve illustrated in FIG. 1 are illustrated in an enlarged manner.
Figure 5B:
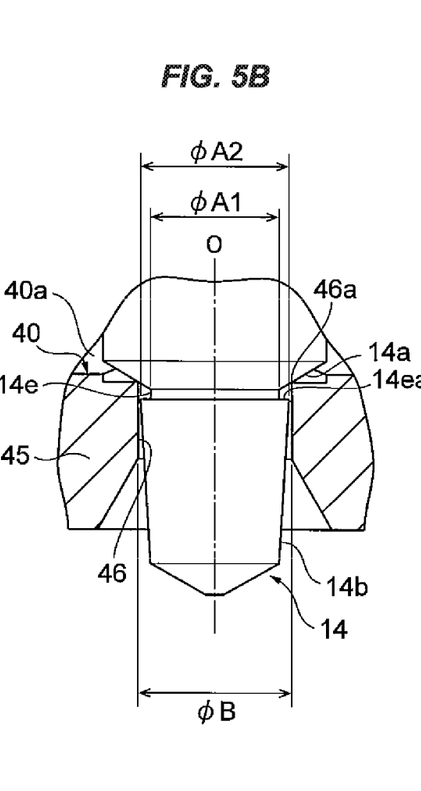
Figure 5C:
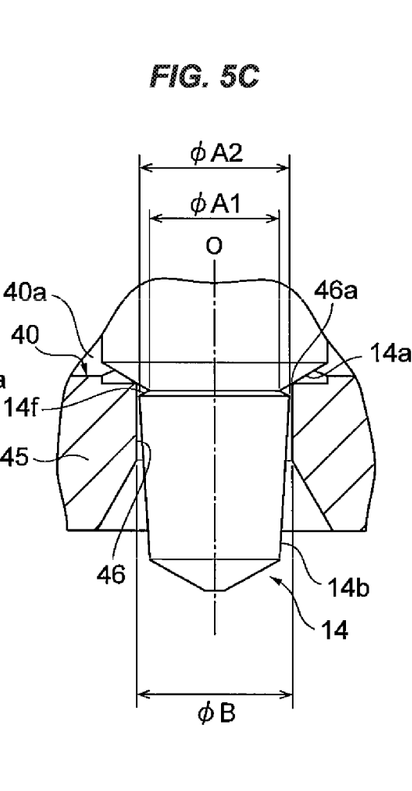

Although the outer diameter ($\varphi$A1) of the lower end portion of the seating surface portion 14*a* of the valve body 14 and the outer diameter ($\varphi$A2) of the upper end portion of the curved surface portion 14*b* are almost equal to each other in the present embodiment, an alternative configuration may also be adopted in which the outer diameter ($\varphi$A2) of the upper end portion of the curved surface portion 14*b* is larger than the outer diameter ($\varphi$A1) of the lower end portion of the seating surface portion 14*a* (that is, the outer diameter ($\varphi$A1) of the lower end portion of the seating surface portion 14*a* is smaller than the outer diameter ($\varphi$A2) of the upper end portion of the curved surface portion 14*b*) as illustrated in, for example, FIGS. 5A to 5C.

In this case, in the example illustrated in FIG. 5A, a constricted surface portion 14*d* configured as an annular concave surface (curved surface) in a cross section including the axis O as in the embodiment described above is disposed between the seating surface portion 14*a* and the curved surface portion 14*b*. In addition, in the example illustrated in FIG. 5B, a cylindrical surface (with a constant outer diameter in the axis O direction) is disposed continuously to the lower end portion of the seating surface portion 14*a*, the cylindrical surface and the upper end portion of the curved surface portion 14*b* are connected to each other by a step portion (terrace surface) 14*ea* including a surface orthogonal to the axis O, and the cylindrical surface and the step portion (terrace surface) 14ea constitute a constricted surface portion 14e smaller in outer diameter than the upper end portion of the curved surface portion 14b. Furthermore, in the example illustrated in FIG. 5C, a constricted surface portion 14f including a truncated cone surface (smaller in outer diameter than the upper end portion of the curved surface portion 14b) with an outer diameter continuously increasing toward the lower side (curved surface portion 14b side) is disposed between the seating surface portion 14a and the curved surface portion 14b.

Regarding the specific dimensions of the electric valves that are provided with the valve body 14 which has the above-described constricted surface portions 14d, 14e, and 14f illustrated in FIGS. 5A, 5B, and 5C, the inner diameter (φB) of the valve seat 46a is larger by 0.005 mm to 0.095 mm than the outer diameter (φA1) of the lower end portion of the seating surface portion 14a of the valve body 14 and the outer diameter (φA2) of the upper end portion of the curved surface portion 14b is larger by 0 mm to 0.08 mm than the outer diameter (φA1) of the lower end portion of the seating surface portion 14a.

It is a matter of course that each of the electric valves that are provided with the valve body 14 which has the above-described constricted surface portions 14d, 14e, and 14f is capable of achieving the same effect as the embodiment illustrated in FIGS. 1 and 2. In addition, in the structure in which the outer diameter (φA2) of the upper end portion of the curved surface portion 14b is larger than the outer diameter (φA1) of the lower end portion of the seating surface portion 14a, the valve seat 46a is reliably seated on the seating surface portion 14a even in a case where the valve stem 10 oscillates in the radial direction because the valve stem 10 does not oscillate more in the radial direction once the upper end portion of the curved surface portion 14b comes into contact with the inner wall surface of the valve port 46. Furthermore, in this structure, the outer diameter (φA1) of the lower end portion of the seating surface portion 14a is certainly equal to or less than the inner diameter (φB) of the valve seat 46a insofar as the outer diameter (φA1) of the lower end portion of the seating surface portion 14a is equal to or less than the outer diameter (φA2) of the upper end portion of the curved surface portion 14b, and thus (radial-direction) dimensional management of the outer diameter (φA1) of the lower end portion of the seating surface portion 14a is facilitated.

Although the inverted truncated cone-shaped tapered surface portion (upper-side tapered surface portion 14ba and lower-side tapered surface portion 14bb) that has the plurality of stages with the control angle increasing in stages toward the tip side constitutes the curved surface portion 14b of the valve body 14 in the embodiment described above, the invention is not limited thereto and it is a matter of course that an ellipsoidal surface portion with a curvature continuously increasing toward the tip, a combination between the ellipsoidal surface portion and an inverted truncated cone-shaped tapered surface portion that has a single stage or a plurality of stages, or the like may constitute the curved surface portion 14b of the valve body 14 instead.

EXPLANATIONS OF LETTERS OR NUMERALS

1 Electric valve
10 Valve stem
14 Valve body
14a Seating surface portion
14b Curved surface portion
14ba Upper-side tapered surface portion
14bb Lower-side tapered surface portion
14c, 14d, 14e, 14f Constricted surface portion
14s Straight portion
20 Guide bush
21 Cylindrical portion
23 Fixing screw portion (male screw portion)
28 Screw feed mechanism
29 Lower stopper mechanism
30 Valve stem holder
33 Movable screw portion (female screw portion)
40 Valve main body
40a Valve chamber
41 First opening
41a First conduit
42 Second opening
42a Second conduit
45 Valve seat portion
46 Valve port
46a Valve seat
46b Diameter-enlarged portion
46s Narrowest portion
47 Flanged portion
50 Stepping motor
51 Rotor
52 Stator
55 Can
60 Compression coil spring
70 Retaining locking member
O Axis

The invention claimed is:

1. An electric valve comprising a valve main body including a valve chamber and a valve port to which a valve seat is attached and a valve body changing a flow rate of a fluid flowing through the valve port in accordance with a lift amount,
wherein the valve body includes a seating surface portion having a lower end adapted to be seated on the valve seat and a curved surface portion adapted to be inserted into the valve port, the curved surface portion having an inverted truncated cone shape with a curved or tapered surface having a diameter that decreases continuously or in stages from an upper end towards a tip of the valve body, and a constricted surface portion smaller in outer diameter than an outer diameter of the upper end of the curved surface portion is provided between the seating surface portion and the curved surface portion,
wherein an inner diameter of the valve seat is larger than an outer diameter of the lower end of the seating surface portion, and the outer diameter of the lower end of the seating surface portion is larger than an outer diameter of an upper end of the curved surface portion.

2. The electric valve according to claim 1,
wherein a cylindrical portion having a constant outer diameter is further disposed between the constricted surface portion and the curved surface portion of the valve body.

3. The electric valve according to claim 1,
wherein a narrowest portion of the valve port that is adjacent to the valve seat includes a cylindrical surface.

4. The electric valve according to claim 1,
wherein the constricted surface portion is configured as an annular concave.

* * * * *